United States Patent
Lyu

(10) Patent No.: US 11,853,029 B2
(45) Date of Patent: Dec. 26, 2023

(54) METHOD, DEVICE AND EQUIPMENT FOR MONITORING SCREWING

(71) Applicant: Jabil Circuit (Wuxi) Co., Ltd., Wuxi (CN)

(72) Inventor: Guoqiang Lyu, Wuxi (CN)

(73) Assignee: Jabil Circuit (Wuxi) Co., Ltd., Wuxi (CN)

(*) Notice: Subject to any disclaimer, the term of this patent is extended or adjusted under 35 U.S.C. 154(b) by 191 days.

(21) Appl. No.: 17/679,490

(22) Filed: Feb. 24, 2022

(65) Prior Publication Data
US 2022/0281044 A1    Sep. 8, 2022

(30) Foreign Application Priority Data
Mar. 3, 2021 (CN) .......................... 202110236694.9

(51) Int. Cl.
*G05B 19/406* (2006.01)
*B23P 19/06* (2006.01)

(52) U.S. Cl.
CPC .......... *G05B 19/406* (2013.01); *B23P 19/066* (2013.01)

(58) Field of Classification Search
CPC ... G05B 19/406; B25B 23/1425; B25B 21/00; B25B 23/14
See application file for complete search history.

(56) References Cited

U.S. PATENT DOCUMENTS

2005/0173142 A1* 8/2005 Cutler ................. B25B 23/1425
173/181
2012/0234569 A1* 9/2012 Lawton ................... B25B 23/14
173/181
2017/0262002 A1 9/2017 Chu

FOREIGN PATENT DOCUMENTS

| | | |
|---|---|---|
| CN | 201244793 Y | 5/2009 |
| CN | 204116983 U | 1/2015 |
| CN | 104972292 A | 10/2015 |
| CN | 105058036 A | 11/2015 |
| CN | 205733745 U | 11/2016 |
| CN | 109909733 A | 6/2019 |
| CN | 110647972 A | 1/2020 |
| JP | H0871942 A | 3/1996 |

* cited by examiner

*Primary Examiner* — Nathaniel C Chukwurah
(74) *Attorney, Agent, or Firm* — Young Basile Hanlon & MacFarlane, P.C.

(57) ABSTRACT

The disclosure provides a method, device and equipment for monitoring screwing. The method for monitoring screwing comprises: obtaining an air pressure value in an air supply line; the air supply line being used to supply air to a pneumatic screwdriver to trigger the pneumatic screwdriver to perform a screwing operation; determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation; judging whether the target monitoring value conforms to a corresponding predetermined range value and obtaining a judgment result; determining, based on the judgment result, whether the pneumatic screwdriver performs the screwing operation properly.

20 Claims, 2 Drawing Sheets

METHOD, DEVICE AND EQUIPMENT FOR MONITORING SCREWING

CROSS REFERENCE TO RELATED APPLICATIONS

This application claims the benefit of priority from the Chinese Patent Applications Nos. 202110236694.9 filed Mar. 3, 2021. The entire content of the aforementioned patent application is incorporated herein by reference.

TECHNICAL HELD

The present disclosure refers to the field of screwing technology, and in particular to a method, device and equipment for monitoring screwing.

BACKGROUND

Currently, pneumatic screwdrivers can be used to drive the screws, saving some human resources as they do not require manual work to drive the screws.

When using a pneumatic screwdriver to drive screws, it can only be observed by technicians based on experience as well as the naked eye to see if the screws are in place. Therefore, it requires more human resources and has limited accuracy.

SUMMARY

Embodiments of the present disclosure provide a method, device and equipment for monitoring screwing to solve the technical problem that, in the related technology, whether a screw is in place can only be observed by technicians based on experience as well as the naked eye when using a pneumatic screwdriver to drive screws, leading to a higher need of human resources and limited accuracy.

In order to solve the above technical problem, the present disclosure is realized as follows.

In a first aspect, there is provided a method for monitoring screwing, said method comprising:
  obtaining an air pressure value in an air supply line; the air supply line being used to supply air to a pneumatic screwdriver to trigger the pneumatic screwdriver to perform a screwing operation;
  determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation;
  judging whether the target monitoring value conforms to a corresponding predetermined range value and obtaining a judgment result;
  determining, based on the judgment result, whether the pneumatic screwdriver performs the screwing operation according to preset requirements.

In a second aspect, there is provided a device for monitoring screwing, said device comprising:
  an obtaining module, configured for obtaining an air pressure value in an air supply line; the air supply line being used to supply air to a pneumatic screwdriver to trigger the pneumatic screwdriver to perform a screwing operation;
  a first determination module, configured for determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation;
  a judgment module, configured for judging whether the target monitoring value conforms to a corresponding predetermined range value and obtaining a judgment result;
  a second determination module, configured for determining, based on the judgment result, whether the pneumatic screwdriver performs the screwing operation according to preset requirements.

In a third aspect, there is provided a equipment for monitoring screwing, comprising: a memory, a processor and a computer program stored on the memory and executable by the processor, the computer program when executed by the processor implementing the steps of the method as described in the first aspect above.

In a fourth aspect, there is provided a computer readable storage medium, the computer readable storage medium having a computer program stored thereon, the computer program when executed by a processor implementing the steps of the method as described in the first aspect above.

At least one of the above technical solutions provided by embodiments of the present disclosure can achieve the following technical effect.

Since the initial air pressure value when the pneumatic screwdriver starts performing the screwing operation, the lower air pressure limit value when the pneumatic screwdriver performing the screwing operation, and the working time of the pneumatic screwdriver for performing the screwing operation are factors that affect the process of screwing by the pneumatic screwdriver, the embodiments of the present disclosure introduce a target monitoring value corresponding to the above factors, and determine whether the pneumatic screwdriver performs the screwing operation according to preset requirements by the target monitoring value corresponding to the screwing operation currently performed by the pneumatic screwdriver and the predetermined range value corresponding to the target monitoring value. It can thus be seen that the present solution can automatically identify whether the pneumatic screwdriver currently performs screwing according to the preset requirements, thus effectively solving the problem of the prior art.

BRIEF DESCRIPTION OF DRAWINGS

The accompanying drawings illustrated herein are used to provide a further understanding of the present disclosure, forming a part of the present disclosure. The schematic embodiments of the disclosure and their descriptions are used to explain the disclosure and do not constitute an undue limitation of the disclosure. In the drawings.

DETAILED DESCRIPTION OF PREFERRED EMBODIMENTS

In order to make the purpose, technical solutions and advantages of the present disclosure more clear, the following will be a clear and complete description of the technical solutions of the present disclosure in conjunction with specific embodiments of the present disclosure and the corresponding accompanying drawings. Obviously, the described embodiments are only a part of the embodiments of the present disclosure, and not all of them. Based on the embodiments in the present disclosure, all other embodiments obtained by a person of ordinary skill in the art without making creative labor fall in the protection scope of the present disclosure.

The technical solutions provided by each embodiment of the present disclosure are described in detail below in conjunction with the accompanying drawings.

Figure 1:
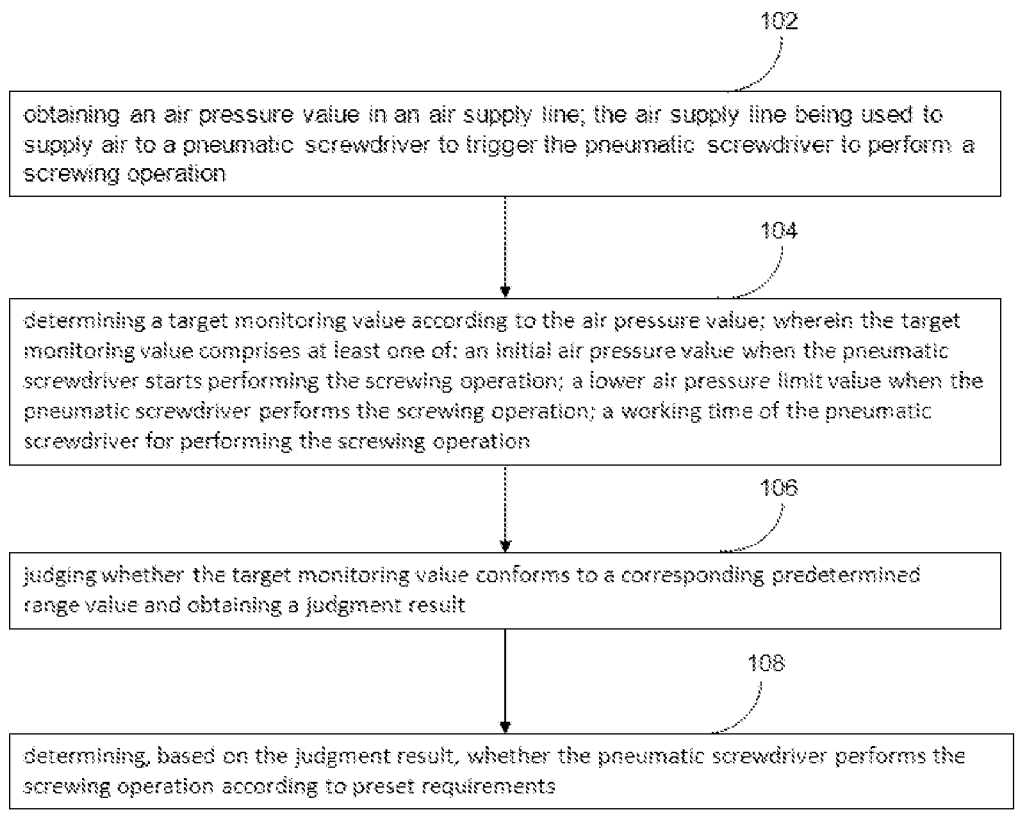
FIG. 1 shows a schematic flow diagram of the method for monitoring screwing provided in one embodiment of the present disclosure.

Referring to the FIG. 1, FIG. 1 shows a schematic flow diagram of the method for monitoring screwing provided in one embodiment of the present disclosure. As shown in FIG. 1, the method is applied to a controller and comprise the following steps.

Step 102: obtaining an air pressure value in an air supply line; the air supply line being used to supply air to a pneumatic screwdriver to trigger the pneumatic screwdriver to perform a screwing operation.

Step 104: determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation.

Step 106: judging whether the target monitoring value conforms to a corresponding predetermined range value and obtaining a judgment result.

Step 108: determining, based on the judgment result, whether the pneumatic screwdriver performs the screwing operation according to preset requirements.

In the embodiments of the present disclosure, the controller can be a logic controller, such as CPLD (Complex Programming logic device), FPGA (Field Programmable Gate Array), etc., or it can be a programmable controller running a computer program. This is not limited by the embodiments of the disclosure.

In embodiments of the present disclosure, the controller can obtain an air pressure value in an air supply line, wherein the air supply line is used to supply air to a pneumatic screwdriver to trigger the pneumatic screwdriver to perform a screwing operation.

Since the air supply line being used to supply air to a pneumatic screwdriver to trigger the pneumatic screwdriver to perform a screwing operation belongs to prior art, so the details will not be covered again here in the embodiments of the disclosure.

In one embodiment, the controller can obtain the aft pressure value in the air supply line by means of an air pressure sensor. The air pressure sensor can be provided in the air supply line and can be connected to the controller. The air pressure sensor can be connected to the controller via physical connection through a wire, or via or wifi, mobile network, Bluetooth, etc. This is not limited by the present embodiment.

The air pressure sensor can detect the air pressure value in the air supply line and can send the detected air pressure value to the controller to enable the controller to obtain the air pressure value in the air supply line.

After obtaining the air pressure value in the air supply line, the controller can determine a target monitoring value according to the air pressure value, wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation.

Since the air pressure value in the air supply line changes during the process of screwing by the pneumatic screwdriver, the controller can determine the initial air pressure value when the pneumatic screwdriver starts performing the screwing operation, the lower air pressure limit value when the pneumatic screw performs the screwing operation, and the working time of the pneumatic screwdriver for performing the screwing operation from the variation of the obtained air pressure value. Since this part can be realized based on the prior art, therefore the details will not be covered again here in the present embodiments.

After determining the target monitoring value, it is able to judge whether the target monitoring value conforms to a corresponding predetermined range value and to obtain a judgment result. The predetermined range value corresponds to the target monitoring value.

In one embodiment, the predetermined range value corresponding to different target monitoring values can be the same or different. This is not limited by the present embodiment.

In one example, the target monitoring value can be the initial air pressure value when the pneumatic screwdriver starts performing the screwing operation, at which point the target monitoring value can correspond to a predetermined range value greater than 0.65 MPa, i.e., $(0.65,+\infty)$ MPa.

In another example, the target monitoring value can be the lower air pressure limit value when the pneumatic screwdriver performs the screwing operation, at which point the target monitoring value can correspond to a predetermined range value less than 0.35 MPa, i.e., $(0, 0.35)$ MPa.

In yet another example, the target monitoring value can be the working time of the pneumatic screwdriver for performing the screwing operation, at which point the target monitoring value can correspond to a predetermined range value greater than 0.3 s, i.e., $(0.3,+\infty)$s, or can correspond to a predetermined range value greater than 0.3 s and less than 0.5 s, i.e., $(0.3, 0.5)$s. When, for example, the target monitoring value is 0.2 s, it can be considered that the working time for screwing is not sufficient and the screw is not completely locked into the product, i.e., the pneumatic screwdriver does not perform the screwing operation according to the preset requirements.

In the present embodiment, the predetermined range value corresponding to the target monitoring value can be set by the relevant personnel according to the actual situation, or can be a default setting value. This is not limited by the present embodiment.

It should be noted that in this embodiment, for different batches of screws, the predetermined range value corresponding to the same target monitoring value can be the same or different; for screws of different lengths, different materials or screw products to be locked of different materials, the predetermined range value corresponding to the same target monitoring value can be the same or different.

In the embodiment of the present disclosure, when the target monitoring value conforms to the corresponding predetermined range value, the judgment result is YES; when the target monitoring value does not conforms to the corresponding predetermined range value, the judgment result is NO.

For example, the target monitoring value can be 0.75 Mpa, and the predetermined range value corresponding to the target monitoring value can be (0.65,+∞) Mpa, then it can be determined that the target monitoring value conforms to the corresponding predetermined range value, and at this time, the judgment result is YES. For example, the target monitoring value can be 0.45 Mpa, and the predetermined range value corresponding to the target monitoring value can be (0, 0.35) Mpa, then it can be determined that the target monitoring value does not conform to the corresponding predetermined range value, and at this time, the judgment result is NO.

After obtaining the judgment result, it can be determined, based on the judgment result, whether the pneumatic screwdriver performs the screwing operation according to preset requirements.

In one embodiment of the disclosure, when the judgment result is YES, it can be determined that the pneumatic screwdriver performs the screwing operation according to the preset requirements; when the judgment result is NO, it can be determined that the pneumatic screwdriver does not perform the screwing operation according to the preset requirements.

In one embodiment of the disclosure, the controller can be connected to a counter (not shown), wherein the controller can be connected to the counter via physical connection through a wire, or via wifi, mobile network, Bluetooth, etc. This is not limited by the present embodiment.

In the embodiments of the disclosure, the counter can be used to count the number of times the pneumatic screwdriver performs the screwing operation according to the preset requirements.

In the embodiments of the disclosure, if it is determined from the judgment result that the pneumatic screwdriver performs the screwing operation according to the preset requirement, i.e., the pneumatic screwdriver correctly performs the screwing operation, the controller can control the counter to add 1 to the count.

For example, the current count of the counter can be 5, then when the controller determines that the pneumatic screwdriver performs the screwing operation according to the preset requirements according to the judgment result, the controller can control the counter to add 1 to the count. At this point, the count of the counter can be 6.

In the embodiments of the disclosure, the controller may also detect whether the air pressure in the air supply line returns to the initial air pressure before controlling the counter to add 1 to the count, and control the counter to add 1 if the air pressure in the air supply line returns to the initial air pressure.

Since the controller can control the counter to add 1 to the count when the pneumatic screwdriver performs the screwing operation according to the preset requirements, it can realize the automatic counting of the number of times of screwing according to the preset requirements, thus eliminating the need for the relevant personnel to count manually, which can effectively save human resources.

In the above embodiments, the controller, after adding 1 to the count of the counter, can also determine whether the count of the counter reaches (not less than) a preset count threshold, and when the count of the counter reaches the preset count threshold, the controller can control the air source to shut off to stop the screwing process of the pneumatic screwdriver.

For example, the preset count threshold can be 6 times, the controller, after adding 1 to the count as 5 of the counter, gets the count of the counter as 6. At this time, the controller can determine whether the count as 6 of the counter reaches the preset count threshold. Because the count as 6 of the counter reaches the preset count threshold, the controller can control the air source to shut off to stop the screwing process of the pneumatic screwdriver.

When the count of the counter reaches the preset count threshold, the controller can control the air source to shut off, at which point the technician can replace with a screw of the next batch to allow the controller to control the pneumatic screwdriver to perform screwing operation on the screw of the next batch.

Since the controller can control the air source to shut off when the count of the counter reaches the preset count threshold, it can realize the automatic counting of the number of times of screwing according to the preset requirements, thus eliminating the need for the relevant personnel to count manually, which can effectively save human resources.

In one embodiment of the present disclosure, if it is determined from the judgment result that the pneumatic screwdriver performs the screwing operation according to the preset requirements, the controller can control the air source to adjust the air pressure value in the air supply line and adjust the working time for screwing, so that the pneumatic screwdriver performs the re-locking operation according to the adjusted air pressure value in the air supply line and the adjusted working time for screwing.

In the embodiments of the disclosure, after determining that the pneumatic screwdriver performs the screwing operation according to the preset requirements, the pneumatic screwdriver can be controlled to perform a re-locking operation on the screw screwed as required. Since the pneumatic screwdriver requires a different air pressure and a different working time for screwing for the re-locking operation than for screwing as required, in the embodiment of the present disclosure, it is able to control the air source to adjust the air pressure value in the air supply line and adjust the working time for screwing when the pneumatic screwdriver performs the re-locking operation.

It is to be noted that in the embodiments of the present disclosure, the controller can control the pneumatic screwdriver to re-lock a screw after the pneumatic screwdriver has finished screwing the same as required; it can also control the pneumatic screwdriver to re-lock screws of a batch after the pneumatic screwdriver has finished screwing the screws of the batch as required.

As can be seen from the above, in the embodiments of the present disclosure, the controller can control the pneumatic screwdriver to automatically re-lock the finished screwed screw after the pneumatic screwdriver has screwed the same as required, which saves human resources since it no longer needs to be manually re-locked by the relevant personnel and, at the same time, solves the problem that the relevant personnel tend to forget the re-locking operation.

In one embodiment of the present disclosure, the controller, when determining whether the pneumatic screwdriver performs the screwing operation according to the preset requirements as described above, may perform at least one of the following operations if, based on the judgment result, it is determined that the pneumatic screwdriver does not perform the screwing operation according to the preset requirements: alarming; controlling the air source to adjust the air pressure; controlling the pneumatic screwdriver to perform the screwing operation on a screw of another batch; controlling the pneumatic screwdriver to perform the screwing operation on a screw of another length; controlling the pneumatic screwdriver to perform the screwing operation on a screw of another material.

In this embodiment, when the controller is alarming, it can be alarmed through a built-in alarm, or through an externally connected alarm, where the alarming manner of the alarm can include an audible alarm, a lighted alarm, a text alarm, etc. This is not limited by the present embodiment.

In this embodiment, the controller can control the air source to adjust the air pressure in the air supply line to trigger the pneumatic screwdriver to perform the screwing operation according to the adjusted air pressure after determining that the pneumatic screwdriver has not performed the screwing operation according to the preset requirements.

Since the air pressure triggering the pneumatic screwdriver may be different for screws of different batches, different lengths or different materials, the screwing process can also be completed by replacing with screws of different batches, different lengths, or different materials. Specifically, the relevant person can replace with screw of different batches, different lengths or different materials, and then the controller can control the pneumatic screwdriver to perform the screwing operation on the screws after replacement.

As can be seen from the above, in this embodiment, the air pressure value in the air supply line can be obtained, and the target monitoring value can be determined according to the air pressure value, wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation. Then, whether the target monitoring value conforms to a corresponding predetermined range value can be judged and a judgment result is obtained, and whether the pneumatic screwdriver performs the screwing operation according to preset requirements is determined based on the judgment result.

Since the initial air pressure value when the pneumatic screwdriver starts performing the screwing operation, the lower air pressure limit value when the pneumatic screwdriver performing the screwing operation, and the working time of the pneumatic screwdriver for performing the screwing operation are factors that affect the process of screwing by the pneumatic screwdriver, the embodiments of the present disclosure introduce a target monitoring value corresponding to the above factors, and determine whether the pneumatic screwdriver performs the screwing operation according to preset requirements by the target monitoring value corresponding to the screwing operation currently performed by the pneumatic screwdriver and the predetermined range value corresponding to the target monitoring value. It can thus be seen that the present solution can automatically identify whether the pneumatic screwdriver currently performs screwing according to the preset requirements, thus effectively solving the problem of the prior art.

Figure 2:
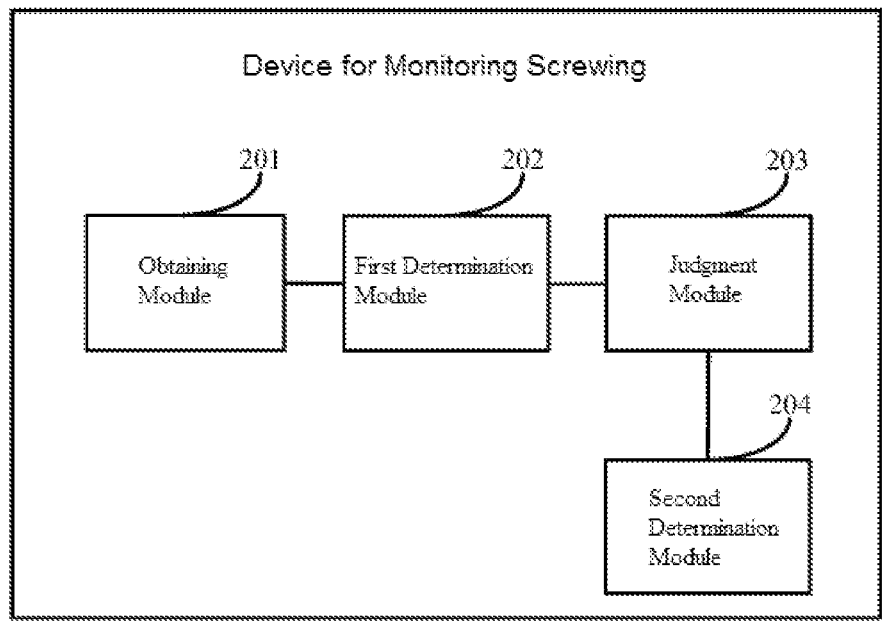
FIG. 2 shows a schematic diagram of modules of the device for monitoring screwing provided in a embodiment of the present disclosure.

Corresponding to the above method for monitoring screwing, the embodiments of the present disclosure also provides a device for monitoring screwing, which is applied to a controller. FIG. 2 shows a schematic diagram of modules of the device for monitoring screwing provided in embodiments of the present disclosure. As shown in FIG. 2, the device for monitoring screwing comprises:

an obtaining module 201, configured for obtaining an air pressure value in an air supply line; the air supply line being used to supply air to a pneumatic screwdriver to trigger the pneumatic screwdriver to perform a screwing operation;

a first determination module 202, configured for determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation;

a judgment module 203, configured for judging whether the target monitoring value conforms to a corresponding predetermined range value and obtaining a judgment result;

a second determination module 204, configured for determining, based on the judgment result, whether the pneumatic screwdriver performs the screwing operation according to preset requirements.

Optionally, the controller is connected to a counter, the device further comprises (not shown in the figures):

a first control module 205, configured for controlling the counter to add 1 to the count if it is determined, based on the judgment result, that the pneumatic screwdriver performs the screwing operation according to the preset requirements; wherein the counter is used to count the number of times the pneumatic screwdriver performs the screwing operation according to the preset requirements.

Optionally, the device further comprises (not shown in the figures):

a third determination module 206, configured for determining whether the count of the counter reaches a preset count threshold;

a second control module 207, configured for controlling an air source to shut off when the count of the counter reaches the preset count threshold; wherein the air source is used to supply air to the air supply line.

Optionally, the device further comprises (not shown in the figures):

a processing module 208, configured for performing at least one of the following operations if, based on the judgment result, it is determined that the pneumatic screwdriver does not perform the screwing operation according to the preset requirements:

alarming;

controlling the air source to adjust the air pressure, wherein the air source is used to supply air to the air supply line;

controlling the pneumatic screwdriver to perform the screwing operation on a screw of another batch;

controlling the pneumatic screwdriver to perform the screwing operation on a screw of another length;

controlling the pneumatic screwdriver to perform the screwing operation on a screw of another material.

Optionally, the device further comprises (not shown in the figures):

a re-locking module 209, configured for, if it is determined from the judgment result that the pneumatic screwdriver performs the screwing operation according to the preset requirements, controlling the air source to adjust the air pressure value in the air supply line and adjust the working time for screwing, so that the pneumatic screwdriver performs a re-locking operation according to the adjusted air pressure value in the air supply line and the adjusted working time for screwing; wherein the air source is used to supply air to the air supply line.

Optionally, the controller is connected to an aft pressure sensor, the obtaining module 201 is used for:
obtaining the air pressure value detected by the aft pressure sensor from the air supply line.

In this embodiment, the air pressure value in the air supply line can be obtained, and the target monitoring value can be determined according to the air pressure value, wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation. Then, whether the target monitoring value conforms to a corresponding predetermined range value can be judged and a judgment result is obtained, and whether the pneumatic screwdriver performs the screwing operation according to preset requirements is determined based on the judgment result.

Since the initial air pressure value when the pneumatic screwdriver starts performing the screwing operation, the lower air pressure limit value when the pneumatic screwdriver performing the screwing operation, and the working time of the pneumatic screwdriver for performing the screwing operation are factors that affect the process of screwing by the pneumatic screwdriver, the embodiments of the present disclosure introduce a target monitoring value corresponding to the above factors, and determine whether the pneumatic screwdriver performs the screwing operation according to preset requirements by the target monitoring value corresponding to the screwing operation currently performed by the pneumatic screwdriver and the predetermined range value corresponding to the target monitoring value. It can thus be seen that the present solution can automatically identify whether the pneumatic screwdriver currently performs screwing according to the preset requirements, thus effectively solving the problem of the prior art.

Figure 3:
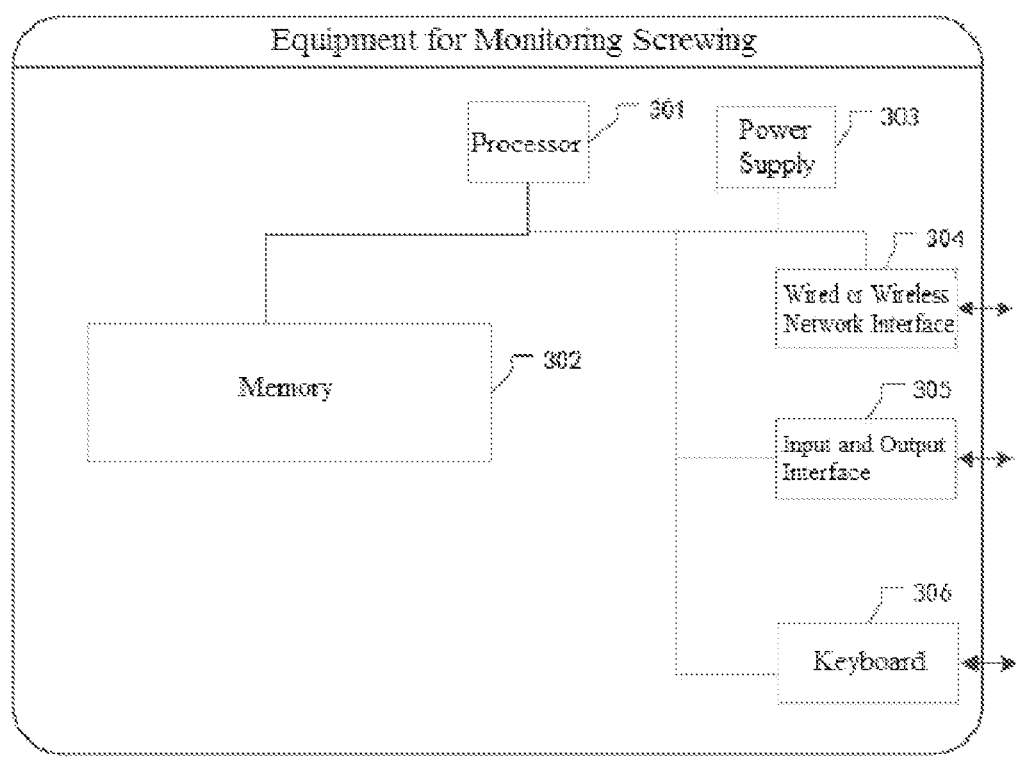
FIG. 3 shows a schematic diagram of the hardware structure of the equipment for monitoring screwing provided in one embodiment of the present disclosure.

Corresponding to the above method for monitoring screwing, the embodiments of the present disclosure also provides a equipment for monitoring screwing. FIG. 3 shows a schematic diagram of the hardware structure of the equipment for monitoring screwing provided in one embodiment of the present disclosure.

The equipment for monitoring screwing may be a terminal device or server and the like for monitoring screwing as provided in the above embodiments.

The equipment for monitoring screwing may vary relatively widely in configuration or performance and may comprise one or more processors 301 and memories 302. The memory 302 may have one or more storage application programs or data stored in it. The memory 302 may be used for ephemeral storage or persistent storage. The application program stored in the memory 302 may comprise one or more modules (not shown in the figures), each module may comprise a series of computer-executable instructions for the equipment for monitoring screwing. Further, the processor 301 may be set to communicate with the memory 302 to execute the series of computer-executable instructions in the memory 302 for the equipment for monitoring screwing. The equipment for monitoring screwing may further comprise one or more power supplies 303, one or more wired or wireless network interfaces 304, one or more input and output interfaces 305, and one or more keyboards 306.

Specifically in the above embodiment, the equipment for monitoring screwing comprises a memory and one or more programs, wherein the one or more programs are stored in the memory, and wherein the one or more programs may comprise one or more modules, each module may comprise a series of computer-executable instructions for the equipment for monitoring screwing, and configured to execute the one or more programs by the one or more processors for implementing the above embodiments.

In this embodiment, the air pressure value in the air supply line can be obtained, and the target monitoring value can be determined according to the air pressure value, wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation. Then, whether the target monitoring value conforms to a corresponding predetermined range value can be judged and a judgment result is obtained, and whether the pneumatic screwdriver performs the screwing operation according to preset requirements is determined based on the judgment result.

Since the initial air pressure value when the pneumatic screwdriver starts performing the screwing operation, the lower air pressure limit value when the pneumatic screwdriver performing the screwing operation, and the working time of the pneumatic screwdriver for performing the screwing operation are factors that affect the process of screwing by the pneumatic screwdriver, the embodiments of the present disclosure introduce a target monitoring value corresponding to the above factors, and determine whether the pneumatic screwdriver performs the screwing operation according to preset requirements by the target monitoring value corresponding to the screwing operation currently performed by the pneumatic screwdriver and the predetermined range value corresponding to the target monitoring value. It can thus be seen that the present solution can automatically identify whether the pneumatic screwdriver currently performs screwing according to the preset requirements, thus effectively solving the problem of the prior art.

In the 1990s, improvements to a technology could be clearly distinguished as hardware improvements (e.g., improvements to circuit structures such as diodes, transistors, switches, etc.) or software improvements (improvements to method flow). However, as technology has evolved, many of today's method flow improvements can already be seen as direct improvements to the hardware circuit structure. Designers almost always obtain the corresponding hardware circuit structure by programming the improved method flow into the hardware circuit. Therefore, it cannot be said that an improvement of a method flow cannot be implemented with a hardware entity module. For example, a Programmable Logic Device (PLD) (e.g., Field Programmable Gate Array (FPGA)) is one such integrated circuit whose logic function is determined by user programming of the device. Instead of having a chip manufacturer design and build an application specific integrated circuit chip, a designer can program a digital system to "integrate" it on a PLD. Moreover, nowadays, instead of making IC chips manually, this programming is mostly implemented by "logic compiler" software, which is similar to the software compiler used for program development and writing, and the original code has to be written in a specific programming language before it is compiled. This is called Hardware Description Language (HDL), and there is not only one HDL, but many kinds, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, RHDL (Ruby Hardware Description Language), etc. The most common ones used today are VHDL (Very-High-Speed Integrated Circuit Hardware Description Language) and Verilog. It should also be clear to those skilled in the art that a hardware circuit that implements the logical method flow can be easily obtained with a little logic programming in one of these hardware description languages and programming the method flow into the integrated circuit.

The controller may be implemented in any suitable manner, for example, the controller may take the form of, for example, a microprocessor or processor and a computer-readable medium storing computer-readable program code (e.g., software or firmware) executable by the (micro)processor, a logic gate, a switch, an Application Specific Integrated Circuit (ASIC), a programmable logic controller, and an embedded microcontroller. Examples of controllers comprise, but are not limited to, the following microcontrollers: ARC 625D, Atmel AT91SAM, Microchip PIC18F26K20, and Silicon Labs C8051F320, and memory controllers may also be implemented as part of the control logic of the memory. It is also known to those skilled in the art that, in addition to implementing the controller in purely computer-readable program code, it is entirely possible to logically program the method steps to make the controller perform the same function in the form of logic gates, switches, specific integrated circuits, programmable logic controllers, embedded microcontrollers, etc. Thus such a controller can be considered as a hardware component, and the devices included therein for implementing various functions can also be considered as structures within the hardware component. Or even, the devices used to implement the various functions can be considered as both software modules that implement the method and structures within the hardware component.

The systems, devices, modules or units illustrated in the above embodiments can be specifically implemented by a computer chip or entity, or by a product with some functionality. An exemplary implementation device is a computer. Specifically, the computer may be, for example, a personal computer, a laptop computer, a cellular phone, a camera phone, a smart phone, a personal digital assistant, a media player, a navigation device, an email device, a gaming console, a tablet computer, a wearable device, or a combination of any of these devices.

For the convenience of description, the above device is described in terms of functions divided into various units. Of course, the functions of each unit can be implemented in one or more software and/or hardware when implementing the present disclosure.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Further, the present disclosure may take the form of a computer program product implemented on one or more computer usable storage media (including, but not limited to, disk memory, CD-ROM, optical memory, etc.) containing computer usable program code therein.

The present disclosure is described with reference to flowchart and/or block diagram of method, equipment (system) and computer program product according to embodiments of the present disclosure. It is to be understood that each flow and/or block in the flowchart and/or block diagram, and the combination of flows and/or blocks in the flowchart and/or block diagram, may be implemented by computer program instructions. These computer program instructions may be provided to a processor of a general purpose computer, a specialized computer, an embedded processor, or other programmable data processing device to produce a machine such that the instructions executed by the processor of the computer or other programmable data processing device produce a device for implementing the functions specified in one or multiple flows in the flowchart and/or one or multiple blocks in the block diagram.

These computer program instructions may also be stored in a computer readable memory capable of directing a computer or other programmable data processing device to operate in a particular manner, such that the instructions stored in the computer readable memory produce an article of manufacture comprising an instruction device that implements the functions specified in one or multiple flows in the flowchart and/or one or multiple blocks in the block diagram.

These computer program instructions may also be loaded onto a computer or other programmable data processing device such that a series of operational steps are executed on the computer or other programmable device to produce computer-implemented processing such that the instructions executed on the computer or other programmable device provide the steps used to perform the functions specified in one or multiple flows in the flowchart and/or one or multiple blocks in the block diagram.

In a typical configuration, a computing device includes one or more processors (CPU), input/output interfaces, network interfaces, and memories.

Memory may in forms of computer readable media, including non-permanent memory, random access memory (RAM) and/or non-volatile memory, such as read-only memory (ROM), or flash RAM. Memory is an example of a computer readable medium.

Computer readable media including permanent and non-permanent, removable and non-removable media can be used by any method or technology to implement information storage. The information may be computer readable instructions, data structures, modules of programs, or other data. Examples of computer storage media include, but are not limited to, Phase Change Random Access Memory (PRAM), Static Random Access Memory (SRAM), Dynamic Random Access Memory (DRAM), other types of Random Access Memory (RAM), Read-Only Memory (ROM), Electrically Erasable Programmable Read-Only Memory (EEPROM), flash memory or other memory technologies, Compact Disc Read-Only Memory (CD-ROM), Digital Versatile Disc (DVD) or other optical storage, magnetic cartridge tape, magnetic tape disk storage or other magnetic storage device, or any other non-transport medium that can be used to store information accessible by a computing device. As defined herein, computer readable media does not include transitory computer readable media (transitory media), such as modulated data signals and carrier waves.

It is also important to note that the terms "include", "comprise" or any other variation thereof are intended to cover non-exclusive inclusion, such that a process, method, article or equipment that includes a series of elements includes not only those elements, but also other elements that are not explicitly listed, or that are inherent to such process, method, article or equipment. Without further limitation, the element defined by the statement "including a/an . . ." does not preclude the existence of additional identical elements in the process, method, article or equipment including the element.

It should be understood by those skilled in the art that embodiments of the present disclosure may be provided as methods, systems, or computer program products. Accordingly, the present disclosure may take the form of an entirely hardware embodiment, an entirely software embodiment, or an embodiment combining software and hardware aspects. Further, the present disclosure may take the form of a computer program product implemented on one or more computer usable storage media (including, but not limited to, disk memory, CD-ROM, optical memory, etc.) containing computer usable program code therein.

The present disclosure may be described in the general context of computer-executable instructions executed by a computer, such as a program module. Generally, program modules include routines, programs, objects, components, data structures and the like that perform a particular task or implement a particular abstract data type. The present disclosure may also be practiced in distributed computing environments where tasks are performed by remote processing devices that are connected via a communication network. In distributed computing environments, program modules may be located in local and remote computer storage media, including storage devices.

Each of the embodiments in this specification are described in a progressive manner, and the same and similar parts of each embodiment can be seen in each other, and each embodiment focuses on the differences from other embodiments. In particular, for system embodiment, because it is basically similar to the method embodiment, so the description is relatively simple, and the relevant parts can be seen in the method embodiment description.

The above is only embodiments of the present disclosure and is not intended to limit the disclosure. To a person skilled in the art, the present disclosure may have various modifications and variations. Any modification, equivalent replacement, improvement, etc. made within the spirit and principle of the present disclosure shall be included in the protection scope of the claims of the present disclosure.

What is claimed is:

1. A method for monitoring screwing, which is applied to a controller, the controller being connected to a counter, the method comprising:
   obtaining an air pressure value in an air supply line; the air supply line being used to supply air to a pneumatic screwdriver;
   determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation;
   judging whether the target monitoring value conforms to a corresponding predetermined range value and obtaining a judgment result;
   determining, based on the judgment result, whether the pneumatic screwdriver performs the screwing operation according to preset requirements;
   controlling the counter to add 1 to the count if it is determined, based on the judgment result, that the pneumatic screwdriver performs the screwing operation according to the preset requirements; wherein the counter is used to count the number of times the pneumatic screwdriver performs the screwing operation according to the preset requirements.

2. The method according to claim 1, wherein said controlling the counter to add 1 to the count comprising:
   controlling the counter to add 1 to the count when the air pressure in the air supply line returns to the initial air pressure when the pneumatic screwdriver starts performing the screwing operation.

3. The method according to claim 1, wherein after said controlling the counter to add 1 to the count, the method further comprising:
   determining whether the count of the counter reaches a preset count threshold;
   controlling an air source to shut off when the count of the counter reaches the preset count threshold; wherein the air source is used to supply air to the air supply line.

4. The method according to claim 1, wherein after said determining, based on the judgment result, whether the pneumatic screwdriver performs the screwing operation according to preset requirements, the method further comprising:
   performing at least one of the following operations if, based on the judgment result, it is determined that the pneumatic screwdriver does not perform the screwing operation according to the preset requirements:
   alarming;
   controlling the air source to adjust the air pressure, wherein the air source is used to supply air to the air supply line;
   controlling the pneumatic screwdriver to perform the screwing operation on a screw of another batch;
   controlling the pneumatic screwdriver to perform the screwing operation on a screw of another length;
   controlling the pneumatic screwdriver to perform the screwing operation on a screw of another material.

5. The method according to claim 1, wherein after said determining, based on the judgment result, whether the pneumatic screwdriver performs the screwing operation according to preset requirements, the method further comprising:
   if it is determined from the judgment result that the pneumatic screwdriver performs the screwing operation according to the preset requirements, controlling the air source to adjust the air pressure value in the air supply line and adjust the working time for screwing, so that the pneumatic screwdriver performs a re-locking operation according to the adjusted air pressure value in the air supply line and the adjusted working time for screwing; wherein the air source is used to supply air to the air supply line.

6. The method according to claim 1, wherein the controller is connected to an air pressure sensor, said obtaining an air pressure value in an air supply line comprising:
   obtaining the air pressure value detected by the air pressure sensor from the air supply line.

7. An equipment for monitoring screwing, characterized by comprising: a memory, a processor and a computer program stored on the memory and executable by the processor, the computer program when executed by the processor implementing the steps of the method according to claim 1.

8. The equipment according to claim 7, wherein computer program stored in the memory may comprise one or more modules, each module may comprise a series of computer-executable instructions for the equipment for monitoring screwing.

9. The equipment according to claim 7, wherein the processor may be set to communicate with the memory to execute the series of computer-executable instructions in the memory for the equipment for monitoring screwing.

10. The equipment according to claim 9, wherein the equipment for monitoring screwing may further comprise a power supply, a wired or wireless network interface, a input and output interface and a keyboard.

11. A computer readable storage medium, characterized in that the computer readable storage medium has a computer program stored thereon, the computer program when executed by a processor implementing the steps of the method according to claim 1.

12. A device for monitoring screwing, which is applied to a controller, the controller being connected to a counter, the device comprising:
    an obtaining module, configured for obtaining an air pressure value in an air supply line; the air supply line being used to supply air to a pneumatic screwdriver to trigger the pneumatic screwdriver to perform a screwing operation;
    a first determination module, configured for determining a target monitoring value according to the air pressure value; wherein the target monitoring value comprises at least one of: an initial air pressure value when the pneumatic screwdriver starts performing the screwing operation; a lower air pressure limit value when the pneumatic screwdriver performs the screwing operation; a working time of the pneumatic screwdriver for performing the screwing operation;
    a judgment module, configured for judging whether the target monitoring value conforms to a corresponding predetermined range value and obtaining a judgment result;
    a second determination module, configured for determining, based on the judgment result, whether the pneumatic screwdriver performs the screwing operation according to preset requirements;
    a first control module, configured for controlling the counter to add 1 to the count if it is determined, based on the judgment result, that the pneumatic screwdriver performs the screwing operation according to the preset requirements; wherein the counter is used to count the number of times the pneumatic screwdriver performs the screwing operation according to the preset requirements.

13. The device according to claim 7, wherein the first control module is configured for controlling the counter to add 1 to the count when the air pressure in the air supply line returns to the initial air pressure when the pneumatic screwdriver starts performing the screwing operation, if it is determined, based on the judgment result, that the pneumatic screwdriver performs the screwing operation according to the preset requirements.

14. The device according to claim 7, wherein the device further comprises:
    a third determination module, configured for determining whether the count of the counter reaches a preset count threshold;
    a second control module, configured for controlling an air source to shut off when the count of the counter reaches the preset count threshold; wherein the air source is used to supply air to the air supply line.

15. The device according to claim 7, wherein the device further comprises:
    a processing module, configured for performing at least one of the following operations if, based on the judgment result, it is determined that the pneumatic screwdriver does not perform the screwing operation according to the preset requirements:
    alarming;
    controlling the air source to adjust the air pressure, wherein the air source is used to supply air to the air supply line;
    controlling the pneumatic screwdriver to perform the screwing operation on a screw of another batch;
    controlling the pneumatic screwdriver to perform the screwing operation on a screw of another length;
    controlling the pneumatic screwdriver to perform the screwing operation on a screw of another material.

16. The device according to claim 7, wherein the device further comprises:
    a re-locking module, configured for, if it is determined from the judgment result that the pneumatic screwdriver performs the screwing operation according to the preset requirements, controlling the air source to adjust the air pressure value in the air supply line and adjust the working time for screwing, so that the pneumatic screwdriver performs a re-locking operation according to the adjusted air pressure value in the air supply line and the adjusted working time for screwing; wherein the air source is used to supply air to the air supply line.

17. The device according to claim 7, wherein the controller is connected to an air pressure sensor, said obtaining module being configured for obtaining the air pressure value detected by the air pressure sensor from the air supply line.

18. The device according to claim 7, wherein the target monitoring value is an initial air pressure value when the pneumatic screwdriver starts performing the screwing operation, and the target monitoring value can correspond to a predetermined range value greater than 0.65 MPa.

19. The device according to claim 7, wherein the target monitoring value is a lower air pressure limit value when the pneumatic screwdriver performs the screwing operation, and the target monitoring value can correspond to a predetermined range value less than 0.35 MPa.

20. The device according to claim 12, wherein the target monitoring value is a working time of the pneumatic screwdriver for performing the screwing operation, and the target monitoring value can correspond to a predetermined range value greater than 0.3 s.

* * * * *